(12) United States Patent
Johnston et al.

(10) Patent No.: US 8,959,864 B2
(45) Date of Patent: Feb. 24, 2015

(54) CRACK RESISTANT MEMBER AND TOWER

(71) Applicant: General Electric Company, Schenectady, NY (US)

(72) Inventors: Bill Damon Johnston, Easley, SC (US); George Albert Goller, Greenville, SC (US); Colwyn Sayers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/244,081

(22) Filed: Apr. 3, 2014

(65) Prior Publication Data

US 2014/0208676 A1    Jul. 31, 2014

Related U.S. Application Data

(62) Division of application No. 13/598,140, filed on Aug. 29, 2012, now Pat. No. 8,726,610.

(51) Int. Cl.
| | |
|---|---|
| *E04G 23/02* | (2006.01) |
| *E04B 1/92* | (2006.01) |
| *E04H 12/08* | (2006.01) |
| *E04H 12/00* | (2006.01) |

(52) U.S. Cl.
CPC ...... *E04B 1/92* (2013.01); *E04H 12/08* (2013.01); *E04H 12/085* (2013.01); *E04H 12/00* (2013.01)
USPC .................................. 52/514; 52/848; 52/245

(58) Field of Classification Search
USPC .......... 52/514, 848, 40, 245, 745.17, 745.18;
416/244 R; 228/170, 174, 178, 225;
219/53–54, 121.11, 121.13, 121.36,
219/121.45, 136, 137 R, 74, 75, 69.12;
29/897.31, 402.08, 402.13, 402.16,
29/525.14
See application file for complete search history.

(56) References Cited

U.S. PATENT DOCUMENTS

| | | | |
|---|---|---|---|
| 2,198,167 | A | 4/1940 | Harman |
| 2,412,972 | A | 12/1946 | Dean |
| 2,412,973 | A | 12/1946 | Dean |
| 3,596,053 | A | 7/1971 | Kameda et al. |
| 4,049,186 | A | 9/1977 | Hanneman et al. |
| 4,348,041 | A | 9/1982 | Imai et al. |
| 4,575,611 | A | 3/1986 | Bertossa |
| 5,085,363 | A | 2/1992 | Sims |

(Continued)

FOREIGN PATENT DOCUMENTS

| | | |
|---|---|---|
| EP | 2047941 A1 | 4/2009 |
| EP | 2390047 A1 | 11/2011 |

(Continued)

OTHER PUBLICATIONS

Machine Translation of JP2005319516, 2005.*

*Primary Examiner* — Brent W Herring
(74) *Attorney, Agent, or Firm* — McNees, Wallace & Nurick, LLC

(57) ABSTRACT

A crack-resistant member for preventing crack propagation, a method of preventing crack propagation, and method of assembly a tower are provided. The crack-resistant member includes at least one insert attached to at least one removed portion at a predetermined location along a girth weld and adjacent a heat affected zone of the tower. The at least one insert is positioned perpendicular to a weld direction and intersecting the girth weld. The at least one insert prevents crack propagation in the girth weld of the tower.

16 Claims, 8 Drawing Sheets

(56) References Cited

U.S. PATENT DOCUMENTS

| | | |
|---|---|---|
| 5,258,600 A | 11/1993 | Arthur |
| 5,674,419 A | 10/1997 | Koide et al. |
| 5,892,119 A | 4/1999 | Bryant et al. |
| 5,892,199 A * | 4/1999 | Ahmed et al. ............ 219/137 R |
| 6,118,098 A | 9/2000 | Amos et al. |
| 6,204,477 B1 | 3/2001 | Lai |
| 6,336,583 B1 * | 1/2002 | Wang et al. .................... 228/175 |
| 6,467,233 B1 * | 10/2002 | Maliszewski et al. .......... 52/831 |
| 6,725,518 B2 * | 4/2004 | Reed ........................... 29/402.17 |
| 7,628,869 B2 | 12/2009 | Martin et al. |
| 7,748,596 B2 * | 7/2010 | Ishikawa et al. ............. 228/119 |
| 7,858,897 B2 * | 12/2010 | Beranger ................ 219/121.14 |
| 7,921,562 B2 * | 4/2011 | Kiji et al. ........................ 29/897 |
| 8,006,380 B2 * | 8/2011 | Rawson et al. .............. 29/889.1 |
| 8,082,719 B2 | 12/2011 | Bagepalli |
| 8,146,320 B2 | 4/2012 | Seidel et al. |
| 8,153,922 B2 * | 4/2012 | Belanger ................ 219/121.13 |
| 8,231,943 B2 * | 7/2012 | Perez et al. ................... 427/409 |
| 8,299,389 B2 * | 10/2012 | Belanger ................ 219/121.14 |
| 8,490,337 B2 * | 7/2013 | Word et al. ........................ 52/40 |
| 2002/0124520 A1 | 9/2002 | Bock et al. |
| 2005/0005562 A1 * | 1/2005 | Henderson et al. ............. 52/633 |
| 2007/0040001 A1 | 2/2007 | Ishikawa et al. |
| 2007/0261349 A1 * | 11/2007 | Goldman et al. ............... 52/514 |
| 2008/0041009 A1 * | 2/2008 | Cairo et al. ................ 52/651.07 |
| 2008/0099446 A1 | 5/2008 | Belanger |
| 2008/0210347 A1 * | 9/2008 | Morin et al. ................... 148/527 |
| 2011/0031223 A1 | 2/2011 | Belanger |
| 2013/0008548 A1 * | 1/2013 | Bowers ........................... 138/97 |
| 2014/0059964 A1 | 3/2014 | Johnston et al. |

FOREIGN PATENT DOCUMENTS

| | | | | |
|---|---|---|---|---|
| JP | 06049955 | | 2/1994 | |
| JP | 2005319516 A | * | 11/2005 | ............ B23K 9/235 |
| JP | 2008238267 A | * | 10/2008 | ............ B23K 31/00 |

* cited by examiner

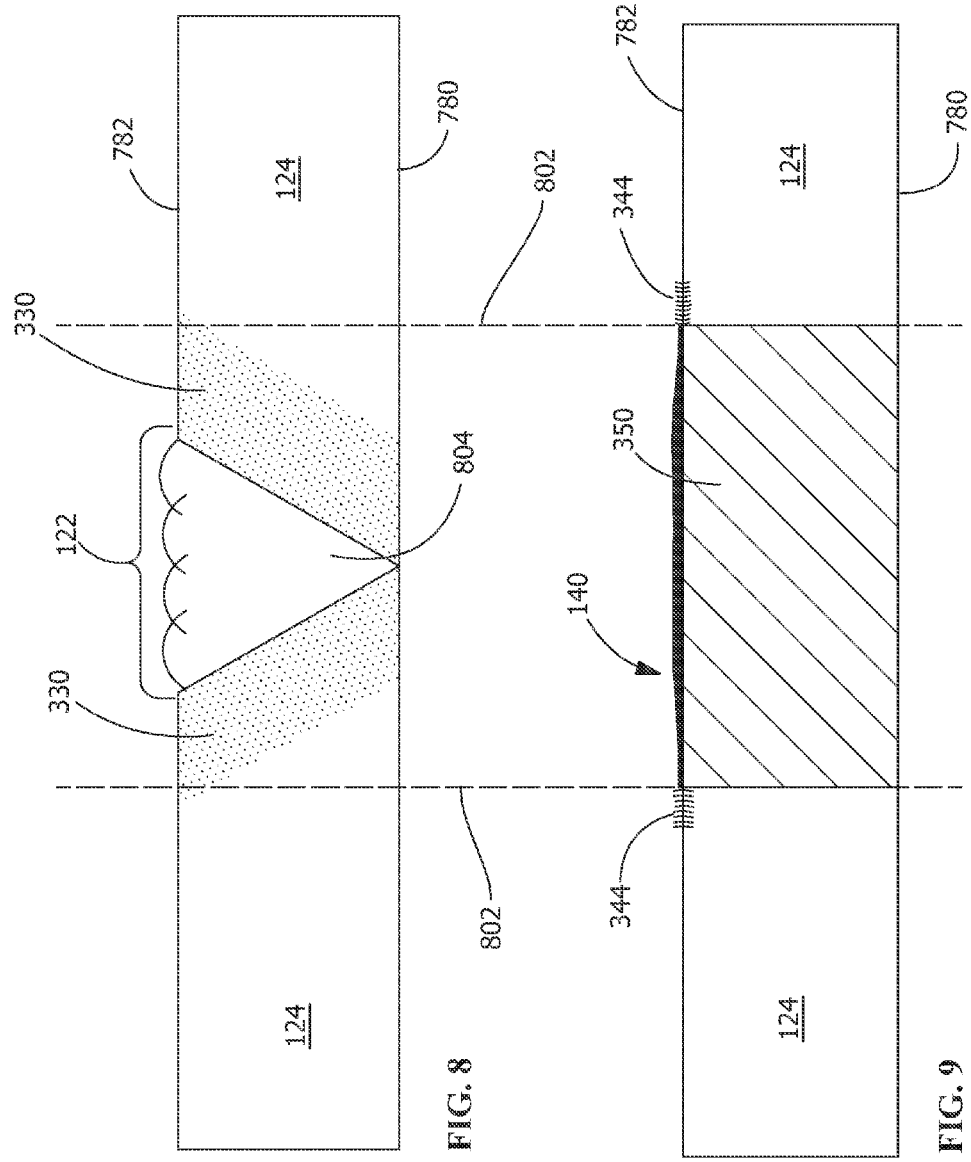

CRACK RESISTANT MEMBER AND TOWER

CROSS REFERENCE TO RELATED APPLICATION

This application relates to and claims the benefit of U.S. patent application Ser. No. 13/598,140, filed Aug. 29, 2012, entitled "A Crack-Resistant Member, a Method of Preventing Crack Propagation, and a Method of Assembling a Tower," the disclosures of which are incorporated by reference in its entirety.

FIELD OF THE INVENTION

The present invention relates generally to towers. More specifically, to a crack-resistant member, a method of preventing crack propagation in a tower, and a method of assembling a tower.

BACKGROUND OF THE INVENTION

Wind towers are fabricated by joining sections of thin-wall piping by butt welding the sections together, end to end. Generally, adjacent sections are welded around a perimeter of a joint defined between the adjoining sections to form a unitary structure. These circumferential (girth) welds and the heat affected zones (HAZs) around the girth weld create a continuous metallurgical and mechanical notch.

The girth welds of tower may be subjected to flexural stresses caused by loads within the tower or induced by the tower during turbine operation. Specifically, high winds acting on the tower may cause increased flexural stresses, and/or the weight of the turbine at the top of the tower and/or the operation of the turbine may induce high cycle vibrational flexural stresses within the tower. Over time, a combination of these factors may cause the girth welds to be subjected to high tensile stresses, which may increase the probability of cracks initiating and propagating at the welds. Weld cracking may reduce the life span of the turbine tower, which in-turn may increase costs associated with maintaining the tower.

Additionally, the continuous metallurgical and mechanical notch of the girth welds and HAZ provides a homogenous path around the full circumference of the tower through which a fatigue crack may propagate. A fatigue crack, once initiated, may progress unimpeded beyond a critical size.

Therefore, a patch, a method of preventing crack propagation in a tower, and a method of assembling a tower that do not suffer from the above drawbacks is desirable in the art.

SUMMARY OF THE INVENTION

According to an exemplary embodiment of the present disclosure, a crack-resistant member for preventing crack propagation in a tower is provided. The crack-resistant member includes at least one insert attached to at least one removed portion at a predetermined location along a girth weld and adjacent a heat affected zone of the tower. The at least one insert is positioned perpendicular to a weld direction and intersecting the girth weld. The at least one insert prevents crack propagation in the girth weld of the tower.

According to another exemplary embodiment of the present disclosure, a method of assembling a tower is provided. The method includes providing a plurality of metal rings. The plurality of metal rings are circumferentially joined with a girth weld, the girth weld creates an adjacent heat affected zone in each of the joined metal rings. At least one portion of the girth weld and the adjacent heat affected zones are removed, the at least one portion is at a predetermined location along the girth weld. A plurality of inserts are provided. The plurality of inserts are attached over the at least one removed portion along the girth weld. The plurality of inserts are positioned perpendicular to a weld direction and intersecting the girth weld. The steps of circumferentially joining through attaching are repeated until the desired section length is achieved. The attachment members are secured to a first side and a second side of the each of the sections. The sections are joined using the attachment members to form the tower. The plurality of inserts prevent crack propagation in the joined metal rings of the sections of the tower.

According to another exemplary embodiment of the present disclosure, a method of preventing crack propagation in an assembled tower is provided. The method includes identifying a crack along a girth weld of a tower. At least one portion of the girth weld and a heat affected zone are removed. The at least one portion is at a predetermined location along the girth weld and adjacent identified crack. A plurality of inserts are provided. The plurality of inserts are attached over the at least one removed portion along the girth weld, the plurality of inserts being positioned perpendicular to a weld direction and intersecting the girth weld. The plurality of inserts prevent crack propagation in the girth weld of the tower.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 8 is a schematic sectional view of the weld and heat affected zone taken in direction 8-8 of FIG. 4 of the present disclosure.

FIG. 9 is a schematic sectional view of a patch taken in direction 9-9 of FIG. 4 of the present disclosure.

Wherever possible, the same reference numbers will be used throughout the drawings to represent the same parts.

DETAILED DESCRIPTION OF THE INVENTION

Provided is a crack-resistant member, a method of preventing crack propagation in a tower, and a method of assembling a tower.

One advantage of an embodiment of the present disclosure includes preventing catastrophic events from missing a weld defect during inspection. Another advantage of an embodiment includes arresting growth of fatigue cracks in tower girth welds. Yet another advantage of an embodiment of the present disclosure includes improving reliability of structural integrity of tower. Another advantage of an embodiment of the present disclosure includes diverting fatigue cracks along a girth weld into the base metal.

Figure 1:
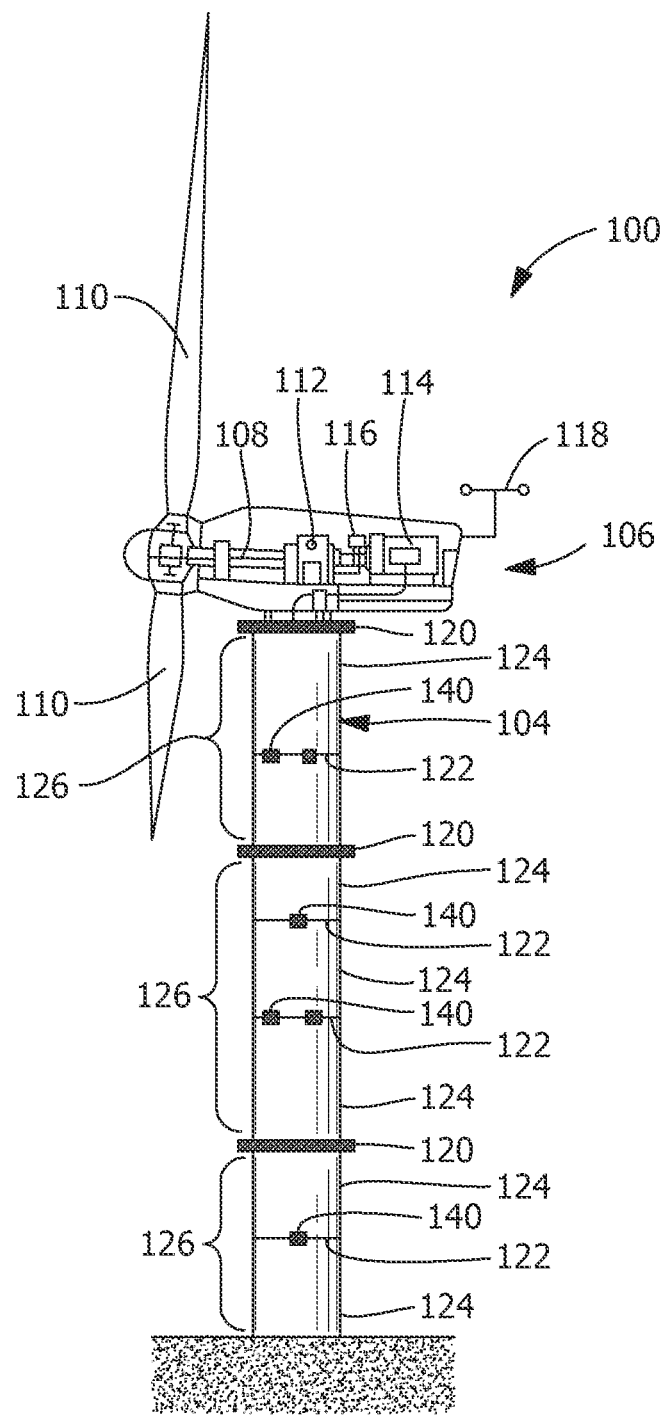
FIG. 1 is a schematic side view of a wind turbine tower of the present disclosure.

Towers are used to mount various items, such as but not limited to, wind turbines, cellular communications, and other items. Although the examples and figures depict a wind turbine tower, the examples are not so limiting. Wind turbines are typically categorized according to the vertical or horizontal axis about which the blades rotate. One so-called horizontal-axis wind generator is schematically illustrated in FIG. 1. This particular configuration for a wind turbine 100 includes a tower 104 supporting a drive train 106 with a rotor 108 that is covered by a protective enclosure referred to as a "nacelle." The blades 110 are arranged at one end of the rotor 108, outside the nacelle, for driving a gearbox 112 connected to an electrical generator 114 at the other end of the drive train 106 arranged inside the nacelle along with a control system 116. An anemometer 118 is also provided on the nacelle for providing information to the control system 116. As illustrated in FIG. 1, tower 104 includes plurality of sections 126 joined by attachment members 120 to form tower 104. Any number of sections 126 may be joined to obtain desired wind turbine tower 104 height.

Figure 2:
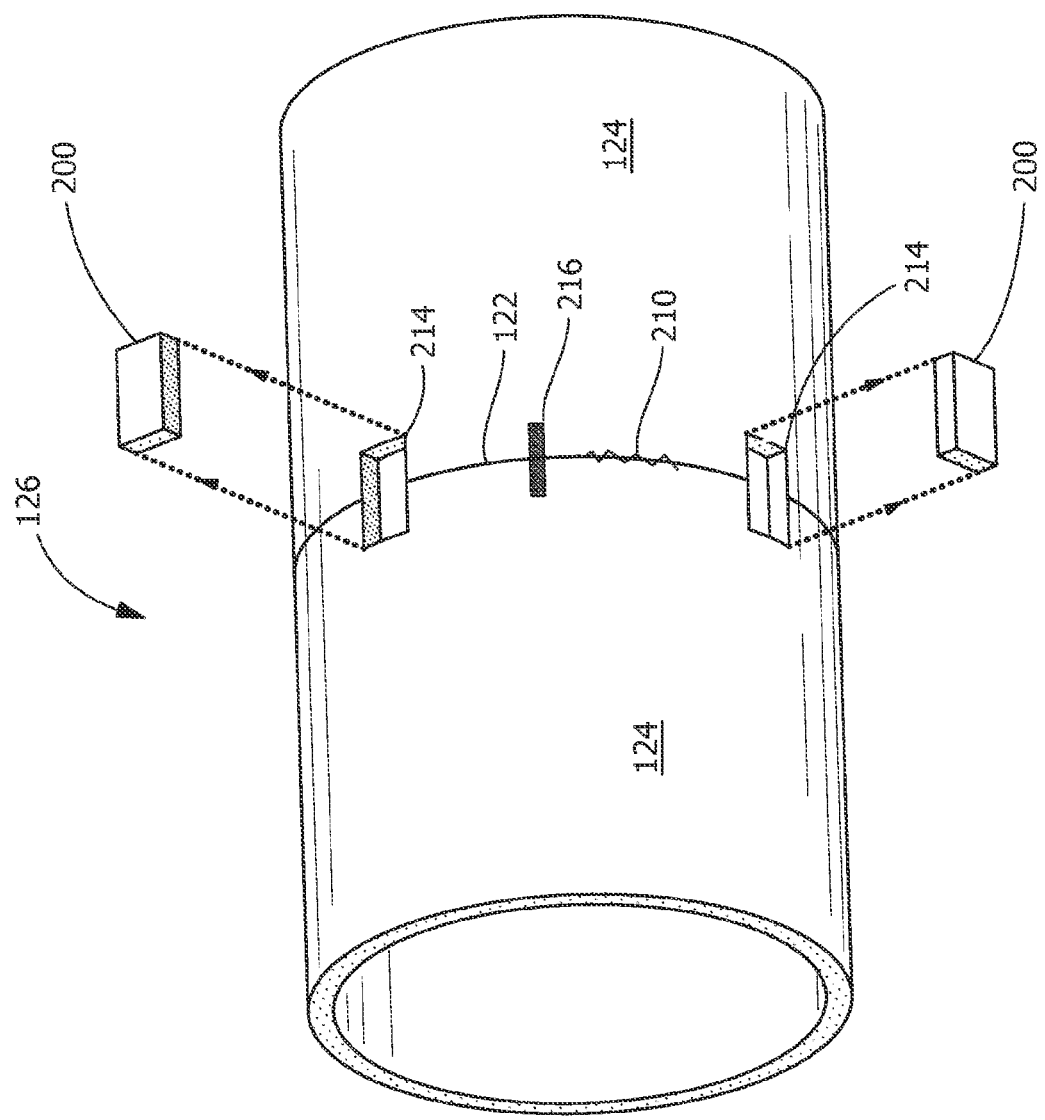
FIG. 2 is a perspective view of a portion of metal rings removed from a tower of the present disclosure.
Figure 3:
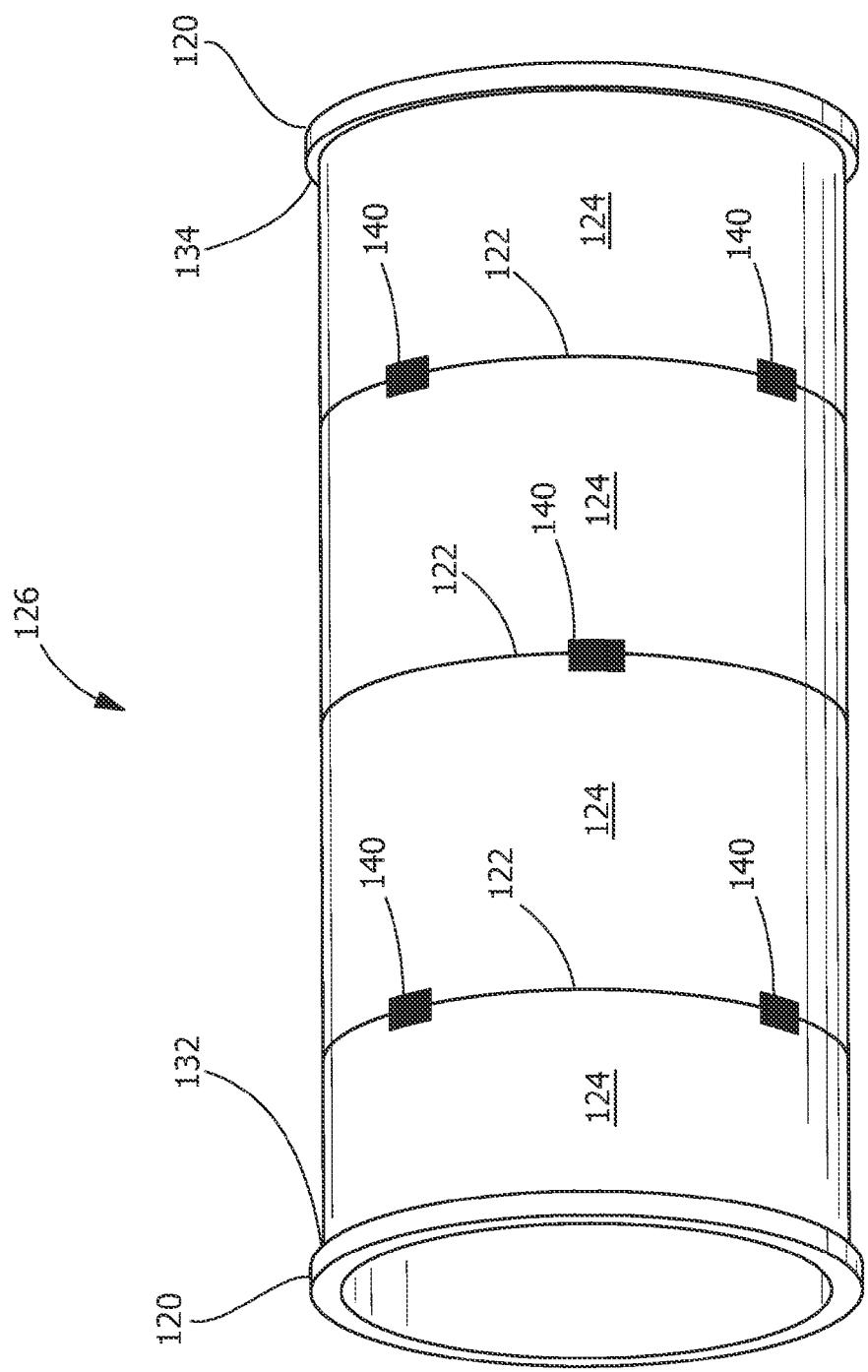
FIG. 3 is a perspective view of a section of a tower of the present disclosure.

FIGS. 2-3 illustrate section 126 of tower 104. FIGS. 4-7 illustrate a crack-resistant member 140 for preventing crack propagation in a tower 104. As illustrated in FIGS. 4-7, crack-resistant member 140 includes at least one insert 350 attached to at least one removed portion 200 (see FIG. 2) at a predetermined location along girth weld 122 and adjacent a heat affected zone (HAZ) 330 (see FIG. 8) of tower 104. At least one insert 350 is positioned perpendicular to weld direction 370 and intersecting girth weld 122. At least one insert 350 prevents crack propagation, which is generally indicated by the arrow labeled 360, in girth weld 122 of tower 104 (see FIG. 1).

FIG. 2 is a perspective view of metal rings 124 joined together by girth weld 122 to form section 126 of tower 104. Any number of metal rings 124 may be joined together by girth weld 122 to form section 126. Generally, girth weld 122 is formed using a sub arc welding process. In the present disclosure, a portion 200 of metal rings 124 is removed along girth weld 122 using any suitable process, such as, but not limited to, machining, grinding, metal cutting, arc cutting processes, and combinations thereof. Removed portion 200 includes girth weld 122 and heat affected zone 330 surrounding girth weld 122 (see FIG. 8). Removed portion 200 may be a rectangular portion 214 cut through metal rings 124. In an alternative embodiment, removed portion 200 may be a slot 216 cut into metal rings 124. FIG. 2 also illustrates a crack 210 in girth weld 122. Cracks 210 may form in girth weld 122 for any number of reasons, such as, but not limited to, stress on girth weld 122. If not addressed, cracks 210 may continue to propagate along girth weld 122 and lead to catastrophic failure of the structure of tower 104. In one embodiment, after identifying crack 212, at least one portion 200 of section 126 is removed. Portion 200 removed is along weld direction 370 (see FIG. 4) of girth weld 122.

FIG. 3 is a perspective view of section 126 of tower 104 including plurality of patches 140 at various predetermined locations along girth weld 122. Each crack-resistant member 140 covers removed portion 200 (see FIG. 2) of girth weld 122 and heat affected zone 300 (see FIG. 8). Location of crack-resistant member 140 depends on the purpose of crack-resistant member 140. In one embodiment, crack-resistant member 140 is used to strengthen girth weld 122. When crack-resistant member 140 is used to strengthen girth weld 122, location of crack-resistant member 140 is determined as a function of the fracture mechanics and load on the tower 104 from the nacelle. To strengthen girth weld 122, for example, crack-resistant member 140 is placed at three or as many as six locations equidistance around girth weld 122, depending on the critical flaw size as determined by fracture mechanics analysis of the particular weld relative to its location along the tower and the particular load placed on that girth weld 122. The primary equations used for fracture mechanics are $K_f = Y_\sigma \sigma \sqrt{\pi a}$ where $Y_\sigma$ is a function of crack length and the thickness of the material, $K_c = \sqrt{EG_e}$ (for plane stress), and $$K_e = \sqrt{\frac{EG_0}{1-v^2}}$$

(for plane strain). Fracture occurs when $K_f \geq K_c$. The above disclosed formulas are used to calculate the critical crack length (critical flaw size), and takes into account loading from wind, gear train, propeller size, and other wind turbine properties, know to those in the art. In another embodiment, crack-resistant member 140 is used to arrest crack 210 (see FIG. 2) propagation. When crack-resistant member 140 is used to arrest crack propagation, location of crack-resistant member 140 is dependent on crack 210 location and weld direction 370 of girth weld 370. To arrest crack propagation along girth weld 122, for example, crack-resistant member 140 is placed at three or as many as six locations equidistance around girth weld 122, depending on the critical flaw size as determined by fracture mechanics analysis of the particular girth weld 122 relative to its location along the tower and the particular load placed on girth weld 122. As depicted in FIG. 3, plurality of metal rings 124 are attached by girth weld 122 to form section 126. Attached to first end 132 and second end 134 of section 126 are attachment members 120, such as, but not limited to, flanges or other attaching means to join sections 126 together to form tower 104.

FIGS. 4-7 are schematics of different embodiments of crack-resistant member 140 of the present disclosure. As depicted in FIGS. 4-7, crack-resistant member 140 includes insert 350 and weld 344 attaching insert to underlying metal ring 124. Insert 350 is positioned perpendicular to weld direction 370 and intersecting girth weld 122. As used herein, "perpendicular to weld direction" means that crack-resistant member 140 is applied over weld in a direction that intersects with the weld direction 370. Insert 350 may include a metal plate 352 or at least one weld bead 454. Width of weld bead 454 ranges from about 6.35 millimeters (about 0.25 inches) to about 38.1 millimeters (1.5 inches). Depending on size of removed portion 200, insert 350 has a first dimension 400 and a second dimension 402. First dimension 400 is about 25.4 millimeters (1 inch) to about 101.6 millimeters (4 inches), or alternatively about 30 millimeters to about 90 millimeters, or alternatively about 40 millimeters to about 80 millimeters. Second dimension 402 is about 50.8 millimeters (2 inches) to about 101.6 millimeters (4 inches), or alternatively about 55 millimeters to about 95 millimeters, or alternatively about 60 millimeters to about 90 millimeters. In one embodiment, first dimension 400 and second dimension 402 are the same. To attach insert 350 to underlying metal rings 124 a lower energy weld process is used. Suitable lower energy weld processes, include, but are not limited to, gas tungsten arc welding (GTAW) and shielded metal arc welding (including flux welding), to form weld 344. Using lower energy welding process prevents the formation of a heat affected zone when attaching insert 350 to metal rings 124. Insert 350 has a greater material tensile strength than girth weld 122 material tensile strength. Typical tower girth welds 122 usually include an about 70 ksi tensile strength filler metal. Suitable examples of material for insert 350, include, materials having a tensile strength of 70,000 psi or greater, which include, but are not limited to, alloy steel plates having the following American Society for Testing and Materials (ASTM) designations: any grade of A 514, A 240 type 201-2, A 240 type 202, and A 240 type 304N. Filler metal used to make weld 344 also has a higher tensile strength than girth weld 122 and is generally includes a metal having about 80 ksi to about 90 ksi tensile strength.

Figure 4:
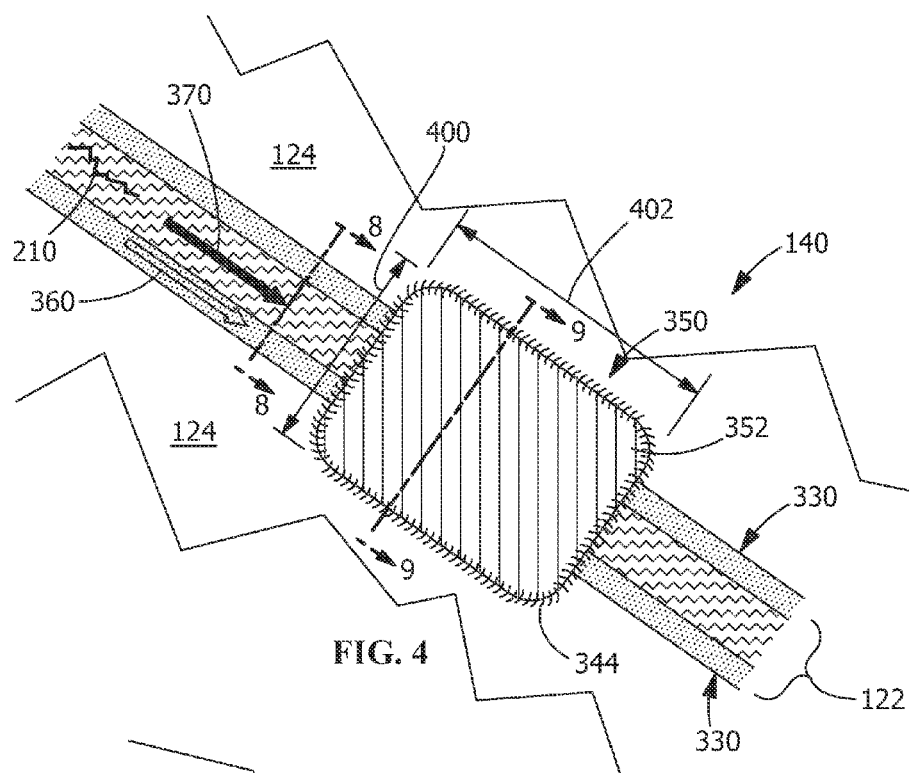
FIG. 4 is a schematic of a crack-resistant member of an embodiment of the present disclosure.

As shown in FIG. 4, insert 350 is a metal plate 352. Metal plate 352 covers and slightly overlaps removed portion 200 (see FIG. 2). Metal plate 352 is attached to underlying metal rings 124 using a low energy weld process. In one embodiment, metal plate 352 is attached to inner diameter 780 of metal rings 124, outer diameter 782 of metal rings 124, or combinations thereof (see FIG. 8). Thickness of metal plate 352 is about 6.35 millimeters (0.25 inches) millimeters to about 50.8 millimeters (2 inches), depending on tower height and location of ring 124 in tower 104.

Figure 5:
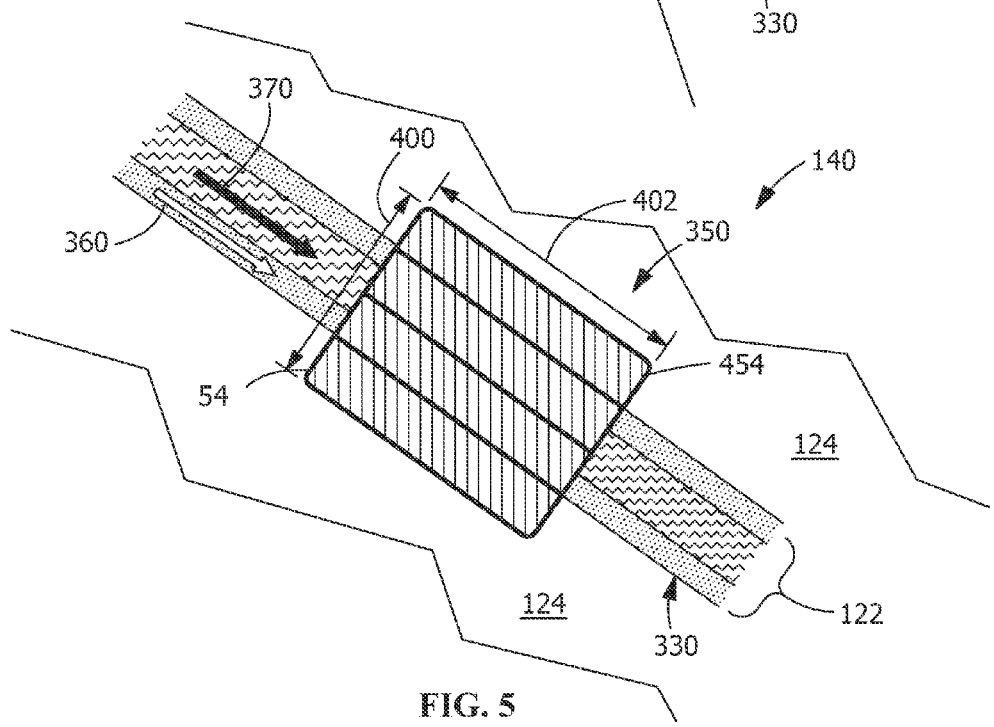
FIG. 5 is a schematic of a crack-resistant member of an embodiment of the present disclosure.
Figure 6:
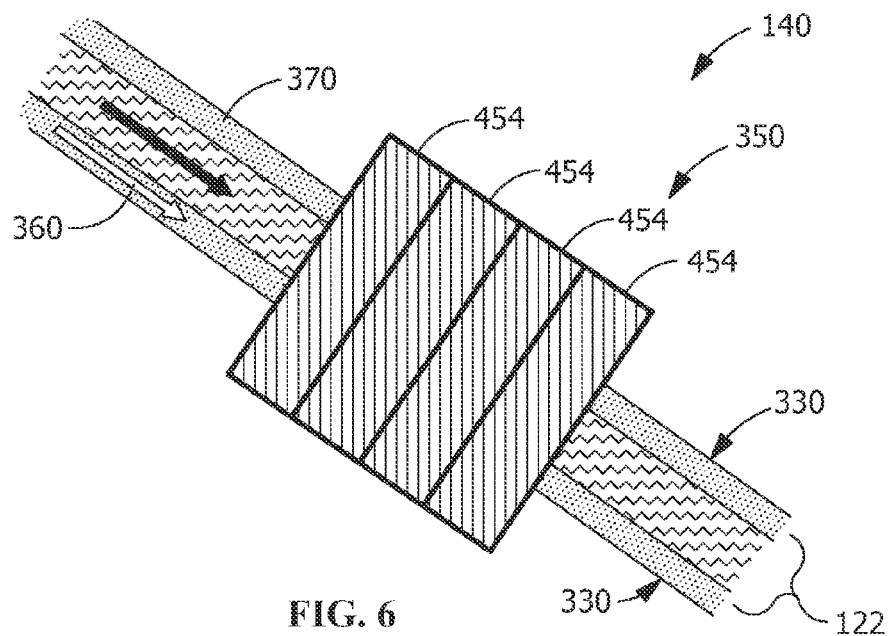
FIG. 6 is a schematic of a crack-resistant member of an embodiment of the present disclosure.
Figure 7:
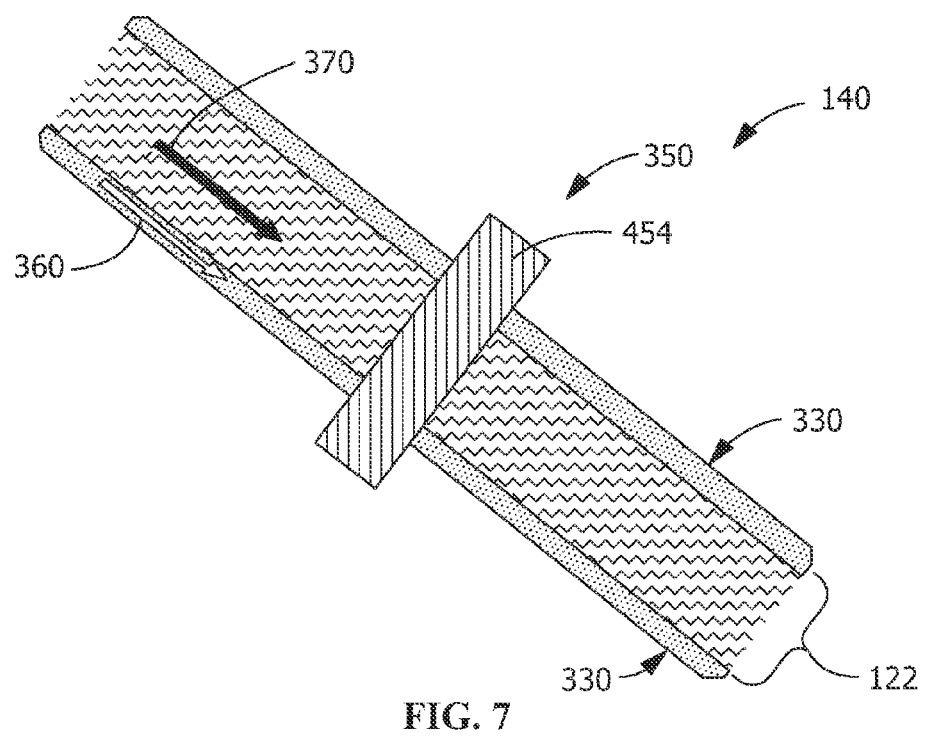
FIG. 7 is a schematic of a crack-resistant member of an embodiment of the present disclosure.

As shown in FIGS. 5-7, insert 350 is plurality of weld beads 454 deposited over removed portion 200 (see FIG. 2). Plurality of weld beads 454 intersect girth weld 122 and are formed on a portion of metal rings 124. In FIG. 5, plurality of weld beads 454 are generally placed in the same direction as weld direction 370. In FIG. 6, plurality of weld beads 454 are perpendicular to weld direction 370. FIG. 7 is a single weld bead 454 covers removed portion 200, in this embodiment, small slot 216 (see FIG. 2).

FIG. 8 is a sectional view of girth weld 122 prior to removing portion 200 (see FIG. 2). As shown in FIG. 8, girth weld 122 is surrounded by heat affected zones 330 in metal rings 124. Heat affected zones 330 include about 6.35 millimeters (0.25 inches) metal ring 124 surrounding girth weld 122. The dashed lines 802 represent the area that is removed to form removed portion 200 (see FIG. 2).

FIG. 9 is a sectional view of crack-resistant member 140 applied to removed portion 200 (see FIG. 2). Crack-resistant member 140 includes insert 350 and weld 344. Crack-resistant member 140 attaches to metal rings 124. Crack-resistant member 140 may be applied to girth weld 122 of sections 126 of tower 104. The number of patches 140 needed is generally a function of the load on girth weld 122 and length of girth weld 122 and fracture mechanics calculated for girth weld 122.

Figure 10:
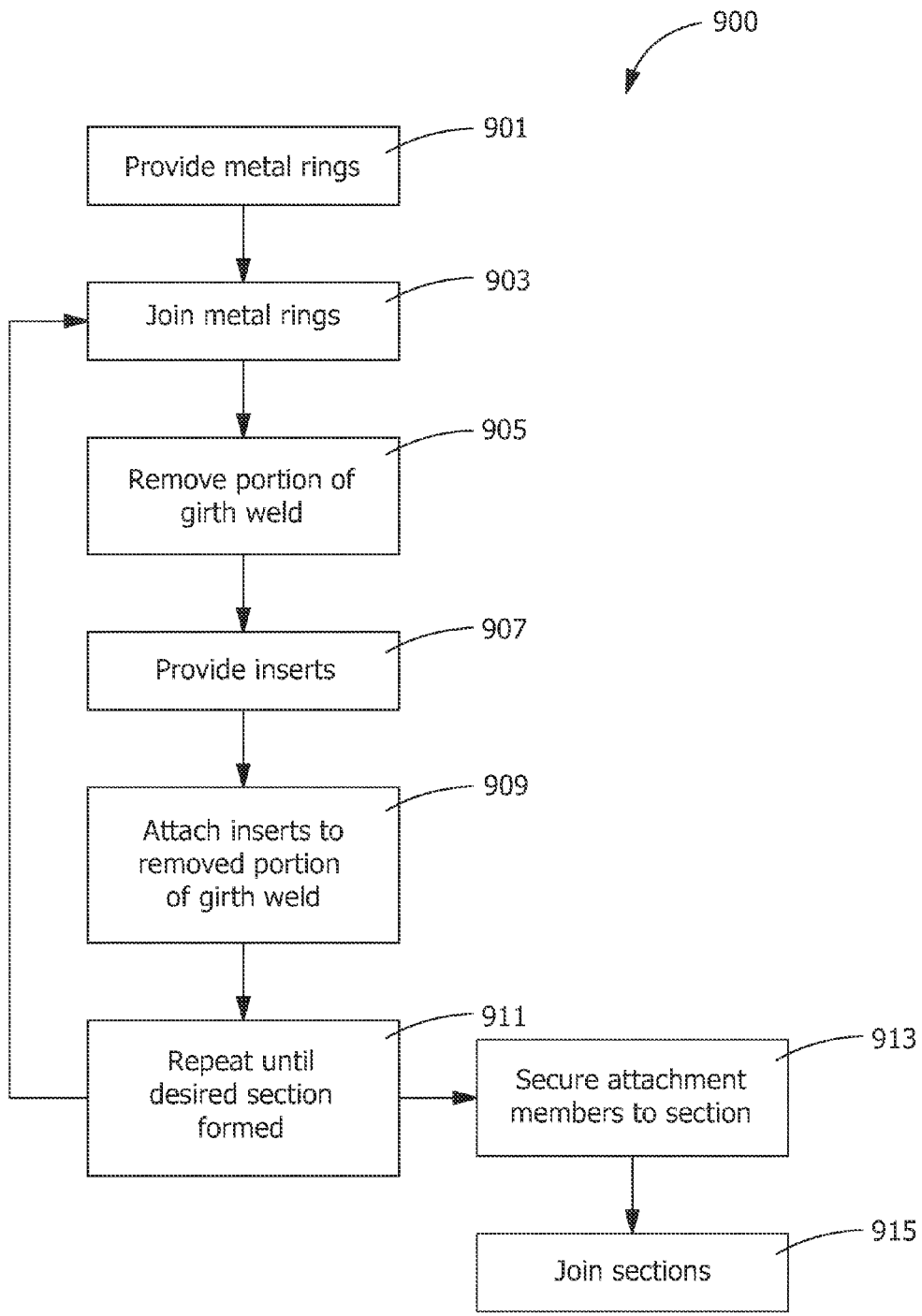
FIG. 10 is a flow chart of a method of assembling of the present disclosure.

FIG. 10 is a flow chart describing a method 900 of assembling tower 104. Method 900 includes providing a plurality of metal rings 124 (see FIGS. 2 and 3), step 901. Method 900 includes circumferentially joining plurality of metal rings 124 with girth weld 122 (see FIGS. 2 and 3), step 903. Girth weld 122 creates an adjacent heat affected zone (HAZ) 330 in each of joined metal rings 124 (see FIG. 7). Method 900 includes removing at least one portion 200 of girth weld 122 and adjacent heat affected zones 300 (see FIG. 2), step 905. At least one portion 200 is at a predetermined location along girth weld 122. Method 900 includes providing plurality of inserts 350 (see FIGS. 3-7), step 907. Method 900 includes attaching plurality of inserts 350 over at least one removed portion 200 along girth weld 122 (see FIGS. 3-7), step 909. Plurality of inserts 350 are positioned perpendicular to weld direction 370 and intersecting girth weld 122 (see FIGS. 4-7). Method 900 includes repeating the steps of circumferentially joining, step 903, through attaching, step 909, until desired section 126 length is achieved. Method 900 includes securing attachment members 120 to first side 132 and second side 134 of sections 126 (see FIG. 3), step 911. Method 900 includes joining sections 126 using attachment members 120 to form tower 104 (see FIG. 1), step 913. Plurality of inserts 350 prevent crack propagation in joined metal rings 124 of the sections of tower 104.

Figure 11:
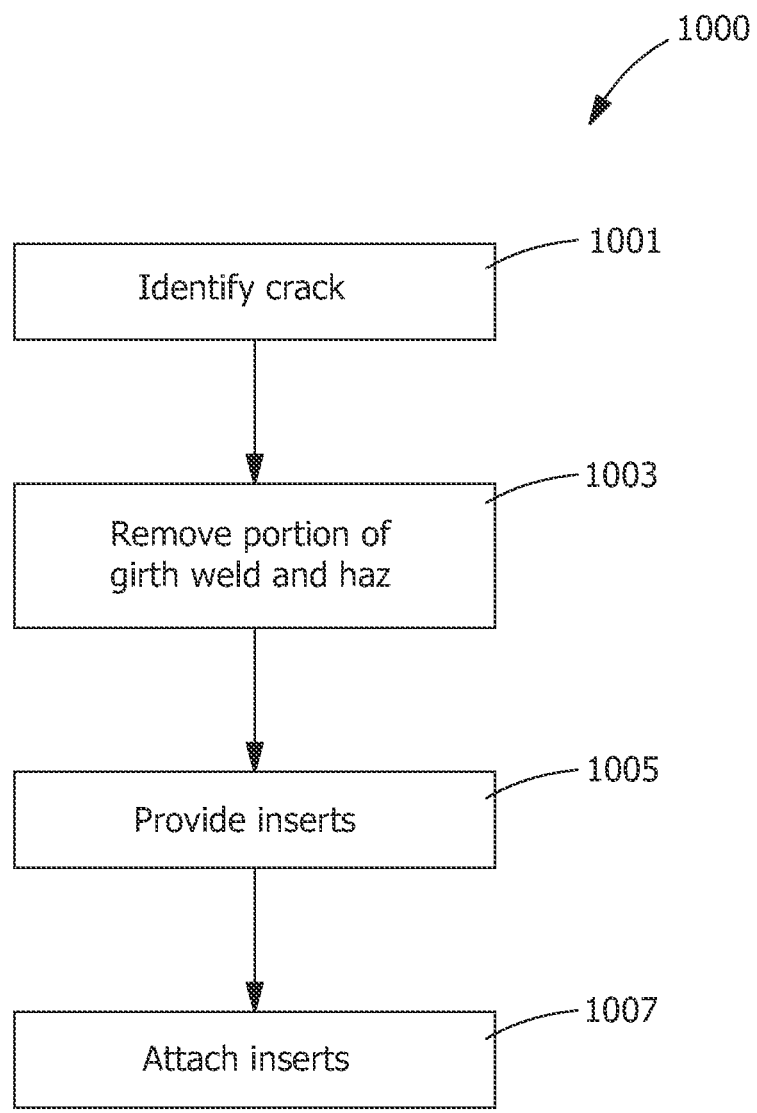
FIG. 11 is a flow chart of method of preventing crack propagation in an assembled tower of the present disclosure.

FIG. 11 is a flow chart describing a method of preventing crack propagation in an assembled tower 104 (see FIG. 1). Method 1000 includes identifying crack 210 along girth weld 122 of tower 104 (see FIG. 2), step 1001. Method 1000; includes removing at least one portion 200 of girth weld 122 and heat affected zone (HAZ) 330 (see FIG. 2), step 1003. At least one portion 200 is at a predetermined location along girth weld 122 and adjacent identified crack 210 (see FIG. 2). Method 1000 includes providing plurality of inserts 350 (see FIG. 3), step 1005. Method 1000 includes attaching plurality of inserts 350 over at least one removed portion 200 along girth weld 122 (see FIGS. 2 and 3), step 1007. Plurality of inserts 350 are positioned perpendicular to weld direction 370 and intersecting girth weld 122 (see FIGS. 4-7). Plurality of inserts 350 prevent crack propagation in girth weld 122 of tower 104 (see FIG. 1).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A crack-resistant member for preventing crack propagation in a tower comprising:
  at least one insert attached to at least one removed portion at a predetermined location along a girth weld and adjacent a heat affected zone of the tower, the at least one insert:
    being essentially flush with the girth weld;
    being positioned perpendicular to a weld direction; and
    having a plurality of substantially linear edges, wherein the plurality of substantially linear edges:
      intersect the girth weld normal to the weld direction; and
      extend beyond the adjacent heat affected zones,
  wherein the at least one insert prevents fatigue crack propagation in the girth weld.

2. The crack-resistant member of claim 1, wherein the at least one insert has a greater material tensile strength than the girth weld material tensile strength.

3. The crack-resistant member of claim 1, wherein the at least one insert comprises a metal plate.

4. The crack-resistant member of claim 1, wherein the at least one insert comprises a plurality of weld beads.

5. The crack-resistant member of claim 1, wherein the crack-resistant member comprises a plurality of inserts.

6. The crack-resistant member of claim 5, wherein the plurality of inserts are equidistant around the girth weld.

7. The crack-resistant member of claim 1, wherein the attachment of the at least one insert to the at least one removed portion comprises a gas tungsten arc weld or a shielded metal arc weld.

8. A tower comprising a plurality of metal rings and at least one crack-resistant member for preventing crack propagation in the tower, wherein:
- the plurality of metal rings comprise at least one girth weld, and at least one heat affected zone adjacent to the at least one girth weld, circumferentially joining the plurality of metal rings; and
- the at least one crack-resistant member comprises at least one insert attached to at least one removed portion at a predetermined location along the at least one girth weld and adjacent the at least one heat affected zone, the at least one insert:
  - being positioned perpendicular to a weld direction;
  - being essentially flush with the girth weld; and
  - having a plurality of substantially linear edges, wherein the plurality of substantially linear edges:
    - intersect the at least one girth weld normal to the weld direction; and
    - extend beyond the at least one adjacent heat affected zones,
- wherein the at least one insert prevents fatigue crack propagation in the at least one girth weld.

9. The tower of claim 8, wherein the at least one insert has a greater material tensile strength than the at least one girth weld material tensile strength.

10. The tower of claim 8, wherein the at least one insert comprises a metal plate.

11. The tower of claim 8, wherein the at least one insert comprises a plurality of weld beads.

12. The tower of claim 8, wherein the at least one crack-resistant member comprises a plurality of inserts.

13. The tower of claim 12, wherein the plurality of inserts are equidistant around the at least one girth weld.

14. The tower of claim 8, wherein the attachment of the at least one insert to the at least one removed portion comprises a gas tungsten arc weld or a shielded metal arc weld.

15. The tower of claim 8, wherein the at least one girth weld comprises a sub arc weld.

16. The tower of claim 8, wherein the tower is a wind tower.

* * * * *